US012038138B2

(12) United States Patent
Shao et al.

(10) Patent No.: US 12,038,138 B2
(45) Date of Patent: Jul. 16, 2024

(54) METHOD FOR DETERMINING ODORIZATION PARAMETERS OF SMART GAS DEVICE MANAGEMENT AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/484,431

(22) Filed: Oct. 10, 2023

(65) Prior Publication Data

US 2024/0035626 A1   Feb. 1, 2024

Related U.S. Application Data

(63) Continuation of application No. 18/157,775, filed on Jan. 20, 2023, now Pat. No. 11,828,422.

(30) Foreign Application Priority Data

Dec. 13, 2022   (CN) .......................... 202211592133.3

(51) Int. Cl.
*F17D 3/12* (2006.01)
*F17D 3/01* (2006.01)
(Continued)

(52) U.S. Cl.
CPC ................. *F17D 3/12* (2013.01); *F17D 3/01* (2013.01); *F17D 3/10* (2013.01); *G06Q 10/04* (2013.01);
(Continued)

(58) Field of Classification Search
CPC .... F17D 3/12; F17D 3/01; F17D 3/10; G06Q 10/04; G06Q 10/0631; G06Q 10/06312; G06Q 50/06; Y02P 90/02
(Continued)

(56) References Cited

U.S. PATENT DOCUMENTS 8,600,566 B1 * 12/2013 Longo ..................... G01M 3/00
                                                       700/282
2001/0047621 A1 * 12/2001 Arnold ..................... F17D 5/02
                                                        48/127.3
(Continued)

FOREIGN PATENT DOCUMENTS

CN      204129520 U      1/2015
CN      106352238 A      1/2017
(Continued)

OTHER PUBLICATIONS

Jiang, Yu et al., Exploring the Technical Sdaptability of Civil Gas Odorization Process, Natural Gas Industry, 2008, 4 pages.
(Continued)

*Primary Examiner* — Minh Q Le
(74) *Attorney, Agent, or Firm* — METIS IP LLC

(57) ABSTRACT

The embodiments of the present disclosure provide method and Internet of Things system for determining odorization parameters of smart gas device management. The method may include obtaining gas data of a first gas sample at a first position of a smart gas pipeline network, odorizing at a second position of the smart gas pipeline network based on the odorization parameters, obtaining inspection data of a second gas sample at a third position of the smart gas pipeline network, and sending the inspection data to the smart gas pipeline network device parameter management sub-platform for analysis and processing, obtaining a target odorization concentration, and determining target odorization parameters, updating the odorization parameters based
(Continued)

on the target odorization parameters, and send updated odorization parameters to the smart gas data center, and odorizing, based on the updated odorization parameters, at the second position of the smart gas pipeline network.

15 Claims, 6 Drawing Sheets

(51) Int. Cl.
  *F17D 3/10* (2006.01)
  *G06Q 10/04* (2023.01)
  *G06Q 10/0631* (2023.01)
  *G06Q 50/06* (2012.01)
(52) U.S. Cl.
  CPC ... *G06Q 10/0631* (2013.01); *G06Q 10/06312* (2013.01); *G06Q 50/06* (2013.01); *Y02P 90/02* (2015.11)
(58) Field of Classification Search
  USPC .................................................. 137/3, 487.5
  See application file for complete search history.

(56) References Cited

U.S. PATENT DOCUMENTS

| | | |
|---|---|---|
| 2008/0071596 A1 | 3/2008 | Smith |
| 2013/0307701 A1 | 11/2013 | Forster-Knight |
| 2020/0320650 A1 | 10/2020 | Agouridis et al. |
| 2020/0370990 A1 | 11/2020 | Chang |
| 2021/0116076 A1 | 4/2021 | Ward et al. |
| 2022/0083083 A1 | 3/2022 | Allmaras et al. |
| 2022/0178590 A1 | 6/2022 | Toussaint et al. |
| 2023/0079768 A1 | 3/2023 | Shao et al. |
| 2023/0094640 A1* | 3/2023 | Shao ................ G05B 13/048 137/551 |
| 2023/0153827 A1* | 5/2023 | Shao ................ G06Q 30/015 705/304 |
| 2023/0167950 A1* | 6/2023 | Shao ...................... F17D 5/005 137/1 |
| 2023/0179660 A1* | 6/2023 | Shao .................... H04L 67/125 709/204 |
| 2023/0205187 A1* | 6/2023 | Shao .................... H04L 67/125 700/28 |
| 2023/0213370 A1* | 7/2023 | Shao ...................... G16Y 10/35 73/272 A |
| 2023/0213917 A1 | 7/2023 | Shao et al. |
| 2023/0214790 A1 | 7/2023 | Shao et al. |
| 2023/0221695 A1 | 7/2023 | Shao et al. |
| 2023/0222384 A1 | 7/2023 | Shao et al. |
| 2023/0228608 A1 | 7/2023 | Shao et al. |
| 2023/0230018 A1 | 7/2023 | Shao et al. |
| 2023/0230050 A1 | 7/2023 | Shao et al. |
| 2023/0247138 A1 | 8/2023 | Shao et al. |

FOREIGN PATENT DOCUMENTS

| | | |
|---|---|---|
| CN | 208154107 U | 11/2018 |
| CN | 111340292 A | 6/2020 |
| CN | 113723834 A | 11/2021 |
| CN | 114001278 A | 2/2022 |
| CN | 114352947 | 4/2022 |
| CN | 115355447 A | 11/2022 |
| CN | 115456315 | 12/2022 |
| WO | 2021197244 A1 | 10/2021 |

OTHER PUBLICATIONS

Wei, Bixia et al., Application of Fuzzy Risk Assessment Based on Neural Network in Urban Buried Gas Pipeline, Oil & Gas Storage and Transportation, 2009, 7 pages.
The Second Office Action in Chinese Application No. 202211592133.3 mailed on Mar. 1, 2023, 33 pages.
Notification to Grant Patent Right for Invention in Chinese Application No. 202211592133.3 mailed on Mar. 12, 2023, 2 pages.

* cited by examiner

METHOD FOR DETERMINING ODORIZATION PARAMETERS OF SMART GAS DEVICE MANAGEMENT AND INTERNET OF THINGS SYSTEM THEREOF

CROSS-REFERENCE TO RELATED APPLICATIONS

This application is a continuation of U.S. application Ser. No. 18/157,775, filed on Jan. 20, 2023, which claims priority of Chinese Patent Application No. 202211592133.3, filed on Dec. 13, 2022, the entire contents of which are hereby incorporated by reference.

TECHNICAL FIELD

The present disclosure relates to a field of gas smart control, and in particular, to a method and an Internet of Things system for determining odorization parameters of smart gas device management.

BACKGROUND

The odorant may be configured to warn of gas leaks because of its special odor. In order to ensure gas safety, an appropriate amount of odorant needs to be added to the gas. At present, gas distribution stations mostly use large-displacement diaphragm pumps and piston pumps to fill on time, or add odorant by gravity drip injection. Because displacement of the diaphragm pumps and the piston pumps is relatively large, it is inconvenient to measure when the odorant with a relatively small flow is added. At the same time, in accordance with a certain odorization standard, odorization at a low peak of gas consumption may make an odorization amount too large, resulting in excessive consumption of odorant, which may increase the cost of odorization; and odorization at a peak of gas consumption may make the odorization amount low because the odorization amount cannot be adjusted in time, which may not meet a requirement of a current national standard.

Therefore, it is desirable to provide a method and an Internet of Thing system for determining odorization parameters of smart gas device management, which can control an amount of added odorant timely and accurately.

SUMMARY

According to one of the embodiments of the present disclosure, an Internet of Things system for determining odorization parameters of smart gas device management is provided. The Internet of Things system comprises a smart gas user platform, a smart gas service platform, a smart gas device management platform, a smart gas sensor network platform, and a smart gas object platform, wherein the smart gas device management platform includes a smart gas data center and a smart gas pipeline network device parameter management sub-platform, the smart gas object platform is configured with a sampling device, an odorization device, and an inspection device, and the smart gas pipeline network device parameter management sub-platform is configured with a device parameter remote management module. The sampling device is configured to obtain gas data of a first gas sample at a first position of a smart gas pipeline network and transmit the gas data to the smart gas data center through the smart gas sensor network platform, wherein the first position is a sampling position. The odorization device is configured to odorize at a second position of the smart gas pipeline network based on the odorization parameters sent by the smart gas data center, wherein the second position is an odorization position. The inspection device is configured to obtain inspection data of a second gas sample at a third position of the smart gas pipeline network and transmit the inspection data to the smart gas data center through the smart gas sensor network platform, and the smart gas data center sends the inspection data to the smart gas pipeline network device parameter management sub-platform for analysis and processing, wherein a distance between the second position and the third position is greater than a first threshold, wherein the third position is a detection position, and the first threshold is a system default value. The device parameter remote management module is configured to: obtain a target odorization concentration; determine target odorization parameters by processing the target odorization concentration and the inspection data through a parameter determination model, wherein the parameter determination model is a machine learning model, wherein the parameter determination model is obtained by reverse training, and the reverse training includes: obtaining historical odorization concentrations and historical inspection data corresponding to different odorization parameters in a historical odorization process as a first training sample, wherein the different odorization parameters are used as a first label of the first training sample; and obtaining the parameter determination model by training based on the first training sample and the first label; update the odorization parameters based on the target odorization parameters, and send updated odorization parameters to the smart gas data center, and the smart gas data center sends the updated odorization parameters to the smart gas object platform through the smart gas sensor network platform. The odorization device is configured to odorize at the second position of the smart gas pipeline network based on the updated odorization parameters.

According to one of the embodiments of the present disclosure, a method for determining odorization parameters of smart gas device management is provided. The method is implemented by an Internet of Things system for determining the odorization parameters of smart gas device management. The Internet of Things system includes a smart gas user platform, a smart gas service platform, a smart gas device management platform, a smart gas sensor network platform, and a smart gas object platform, the smart gas device management platform includes a smart gas data center and a smart gas pipeline network device parameter management sub-platform, the smart gas object platform is configured with a sampling device, an odorization device, and an inspection device, the smart gas pipeline network device parameter management sub-platform is configured with a device parameter remote management module. The method comprises: obtaining gas data of a first gas sample at a first position of a smart gas pipeline network and transmitting the gas data to the smart gas data center through the smart gas sensor network platform based on the sampling device, wherein the first position is a sampling position; odorizing at a second position of the smart gas pipeline network based on odorization parameters sent by the smart gas data center through the odorization device, wherein the second position is an odorization position; obtaining inspection data of a second gas sample at a third position of the smart gas pipeline network and transmitting the inspection data to the smart gas data center through the smart gas sensor network platform based on the inspection device, and the smart gas data center sending the inspection data to the smart gas pipeline network device parameter management sub-platform for analysis and processing, wherein a distance between the second position and the third position is greater than a first threshold, wherein the third position is a detection position, and the first threshold is a system default value; obtaining a target odorization concentration through the device parameter remote management module, and determining target odorization parameters by processing the target odorization concentration and the inspection data through a parameter determination model, wherein the parameter determination model is a machine learning model, wherein the parameter determination model is obtained by reverse training, and the reverse training includes: obtaining historical odorization concentrations and historical inspection data corresponding to different odorization parameters in a historical odorization process as a first training sample, wherein the different odorization parameters are used as a first label of the first training sample; and obtaining the parameter determination model by training based on the first training sample and the first label; updating the odorization parameters based on the target odorization parameters through the device parameter remote management module, and send updated odorization parameters to the smart gas data center, and the smart gas data center sends the updated odorization parameters to the smart gas object platform through the smart gas sensor network platform; and odorizing, based on the updated odorization parameters, at the second position of the smart gas pipeline network through the odorization device.

According to one of the embodiments of the present disclosure, a non-transitory computer-readable storage medium storing computer instructions is provided. When reading the computer instructions in the storage medium, a computer may implement the method for determining odorization parameters of smart gas device management.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
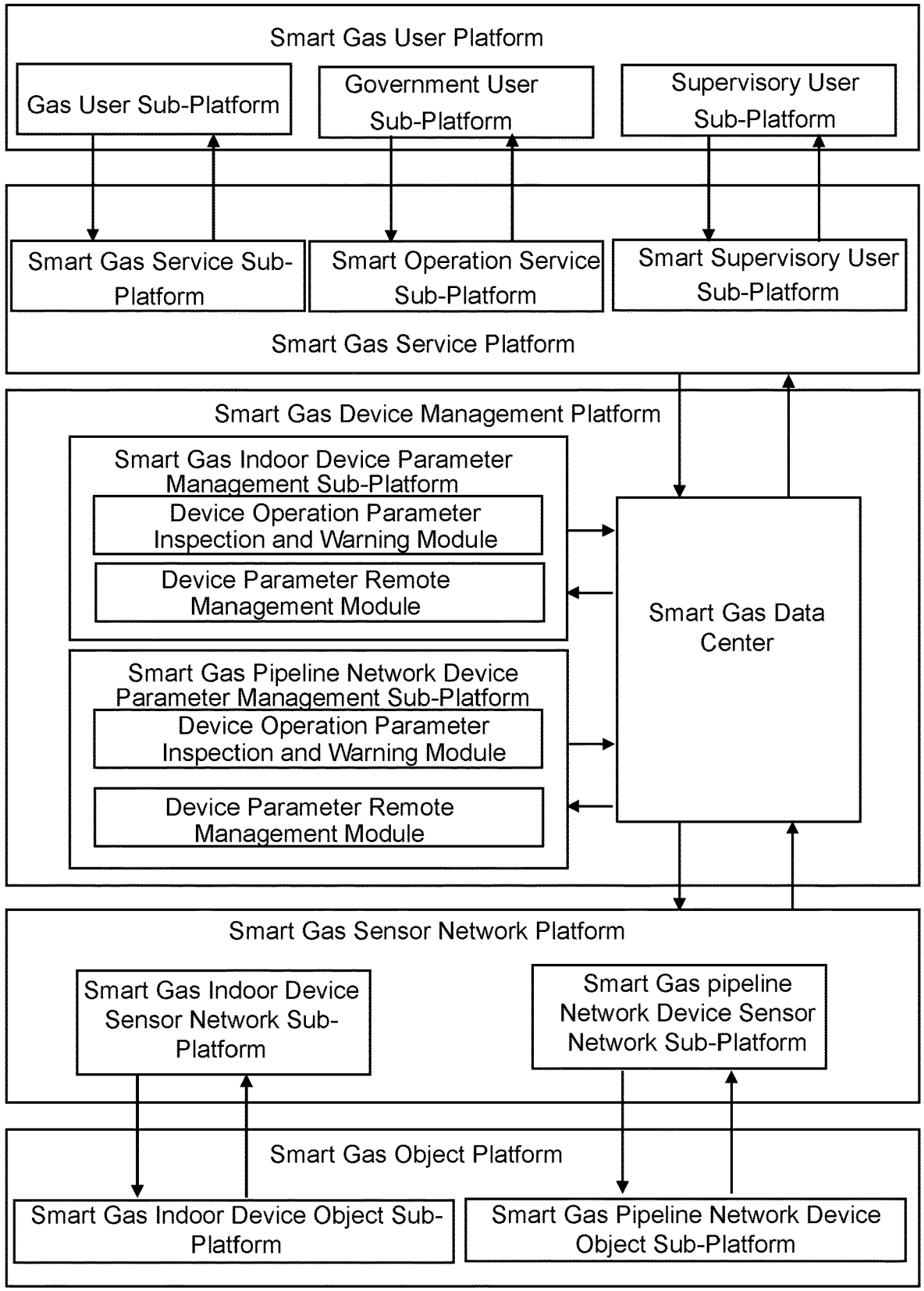
FIG. 1 is a structure diagram illustrating an exemplary Internet of Things system for controlling automatic odorization of smart gas device management according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a structure diagram illustrating an exemplary Internet of Things system for controlling automatic odorization of smart gas device management according to some embodiments of the present disclosure.

As shown in FIG. 1, the Internet of Things system 100 may include a smart gas user platform, a smart gas service platform, a smart gas device management platform, a smart gas sensor network platform, and a smart gas object platform interacting in turn. The smart gas user platform, the smart gas service platform, the smart gas device management platform, the smart gas sensor network platform, and the smart gas object platform may interact by communication connection in turn.

The smart gas user platform may be a platform for interacting with users. In some embodiments, the smart gas user platform may be configured as a terminal device. For example, the terminal device may include a smart electronic device that implement data processing as well as data communication such as a laptop computer, a cell phone, etc., which will not be overly limited herein. In some embodiments, the smart gas user platform may be configured to receive gas device operation and management information transmitted by the smart gas service platform, and may further be configured to transmit the received gas device operation and management information query instructions to the smart gas service platform.

In some embodiments, the smart gas user platform may include a gas user sub-platform, a government user sub-platform, and a supervisory user sub-platform so that a gas user, a government user, and a supervisory user may all receive the gas device operation and management information transmitted by the smart gas service platform. The gas user may be a user that uses gas. The government user may be a user that provides gas operation services. The supervisory user may be a user that supervises safety of gas usage. In some embodiments, the gas user sub-platform may be configured to receive gas device-related information, such as gas device maintenance, a gas usage safety reminder, etc. transmitted by an smart gas service sub-platform, and may also be configured to transmit gas usage query instructions to the smart gas service sub-platform. In some embodiments, the government user sub-platform may receive information related to gas operation, such as information on whether to add odorant, transmitted by a smart operation service sub-platform. In some embodiments, the supervisory user sub-platform may be configured to receive the gas device operation and management information, gas safety operation information, etc. such as information on addition of odorant, transmitted by a smart supervisory service sub-platform, and may further be configured to transmit safety management query instructions or gas pipeline network abnormality query instructions to the smart supervisory service sub-platform.

The smart gas service platform may be a platform for receiving and transmitting data and/or information. In some embodiments, the smart gas service platform may be configured to receive the gas device operation and management information transmitted by the smart gas data center in the smart gas device management platform, and transmit the gas device operation and management information to the smart gas user platform. The smart gas service platform may be also used to receive the gas device operation and management information query instructions issued by the smart gas user platform and transmit the gas device operation and management information query instructions to the smart gas data center.

In some embodiments, the smart gas service platform may include the smart gas service sub-platform, the smart operation service sub-platform, and the smart supervisory service sub-platform. The smart gas service sub-platform, the smart operation service sub-platform, and the smart supervisory service sub-platform may interact with the gas user sub-platform, the government user sub-platform, and the supervisory user sub-platform correspondingly to receive query instructions issued by the corresponding user sub-platforms and transmit the query instructions to the smart gas data center, receive the gas device operation and management information transmitted by the smart gas data center and transmit the gas device operation and management information to the corresponding user sub-platforms.

The smart gas device management platform may be configured to coordinate, manage, and analyze gas-related data (e.g., gas data and inspection data, etc.) in the smart gas pipeline network. In some embodiments, the smart gas device management platform may receive, analyze, and process the gas-related data uploaded by the smart gas sensor network platform, and send the processed data to the smart gas object platform through the smart gas sensor network platform.

In some embodiments, the smart gas device management platform may include a smart gas data center, a smart gas indoor device parameter management sub-platform, and a smart gas pipeline network device parameter management sub-platform. Both the smart gas pipeline network device parameter management sub-platform and the smart gas indoor device parameter management sub-platform may include a device operation parameter inspection and warning module and a device parameter remote management module. The device operation parameter inspection and warning module may be configured to view historical data and real-time data of device operation parameters in the smart gas pipeline network, inspect and warn according to a preset threshold, and may further be configured to initiate warning messages. The device parameter remote management module may be configured to remotely set and adjust the device parameter of the smart gas object platform, and remotely authorize the device parameter adjustment initiated by the smart gas object platform on site.

In some embodiments, the smart gas data center may receive the gas-related data in the smart gas pipeline network transmitted by the smart gas sensor network platform and send the gas-related data to the smart gas pipeline network device parameter management sub-platform for analysis and processing. For example, the smart gas pipeline network device parameter management sub-platform may be configured with a device parameter remote management module. The device parameter remote management module may process the gas-related data, determine and update the odorization parameters, send the updated odorization parameters to the smart gas data center, and send the updated odorization parameters to the smart gas object platform through the smart gas sensor network platform. The smart gas data center may further receive gas device operation and management information query instruction transmitted by the smart gas service platform and transmit the gas device operation and management information query instruction to the smart gas sensor network platform.

The smart gas sensor network platform configured as a communication network and a gateway may be configured to receive the gas-related data in the smart gas pipeline network obtained by the smart gas object platform and transmit the gas-related data to the smart gas data center. The smart gas sensor network platform may further receive the gas device operation and management information query instruction and the odorization parameters transmitted by the smart gas data center and transmit the gas device operation and management information query instruction and the odorization parameters to the smart gas object platform.

In some embodiments, the smart gas sensor network platform may include a smart gas indoor device sensor network sub-platform and a smart gas pipeline network device sensor network sub-platform. The smart gas indoor device sensor network sub-platform and the smart gas pipeline network device sensor network sub-platform may receive the gas device operation and management information query instruction from the smart gas data center and transmit the gas device operation and management information query instruction to the smart gas indoor device object sub-platform and the smart gas pipeline network device object sub-platform, respectively.

The smart gas object platform may be configured to obtain the gas-related data in the smart gas pipeline network. For example, the smart gas object platform may be equipped with a sampling device, an odorization device, and an inspection device. The sampling device may be configured to obtain gas data. The odorization device may be configured to odorize the gas. The inspection device may be configured to obtain inspection data. In some embodiments, the smart gas object platform may also be configured to receive the gas device operation and management information query instruction transmitted by the smart gas sensor network platform. In some embodiments, the smart gas object platform may be configured as various types of gas devices, including an indoor devices, a pipeline network device, etc. The indoor device may be a device contained by the place of gas user. The pipeline network device may be a device contained in the gas pipeline network, for example, an odorization device, a gas pipeline, a gas flow meter, a valve control device, a thermometer, a barometer, etc.

It should be understood that the system and the modules thereof shown in FIG. 1 may be implemented in various ways.

It should be noted that the above description of the Internet of Things system 100 and the modules thereof is merely for convenience of illustration and not intended to limit the present disclosure to the scope of the embodiments. It is understood that for those skilled in the art, after understanding the principle of the system, it may be possible to arbitrarily combine various modules or form a sub-system to connect with other modules without departing from this principle. In some embodiments, the smart gas user platform, the smart gas service platform, the smart gas device management platform, the smart gas sensor network platform, and the smart gas object platform disclosed in FIG. 1 may be different modules in one system or one module implementing the functions of the two or more modules. For example, each module may share a storage module, and each module may have its storage module. Such variations are within the scope of protection of the present disclosure.

Figure 3:
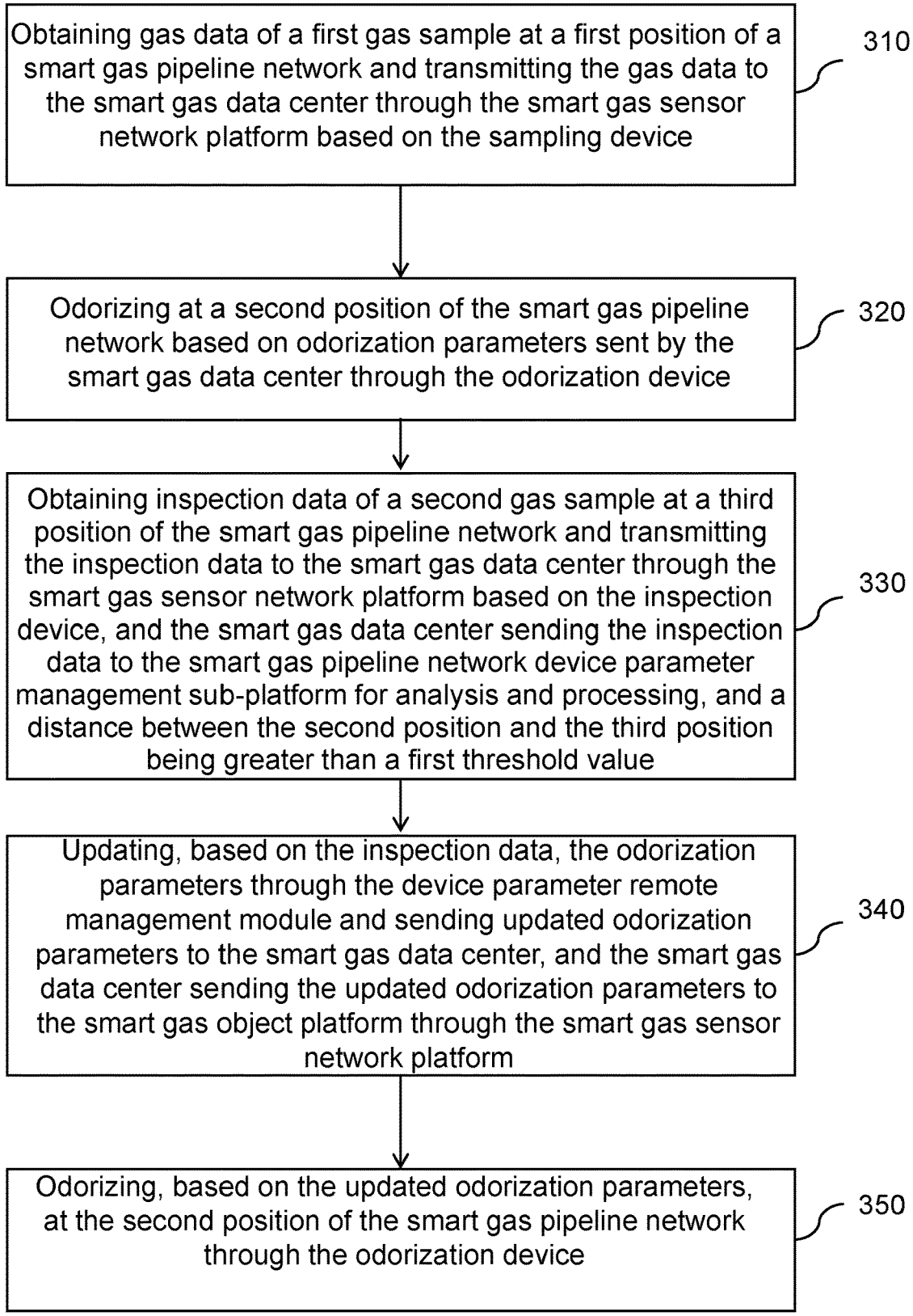
FIG. 3 is a flowchart illustrating an exemplary process of a method for controlling automatic odorization of smart gas device management according to some embodiments of the present disclosure.

FIG. 3 is a flowchart illustrating an exemplary process of a method for controlling automatic odorization of smart gas device management according to some embodiments of the present disclosure.

In 310, obtaining gas data of a first gas sample at a first position of a smart gas pipeline network and transmitting the gas data to the smart gas data center through the smart gas sensor network platform based on a sampling device.

Figure 2:
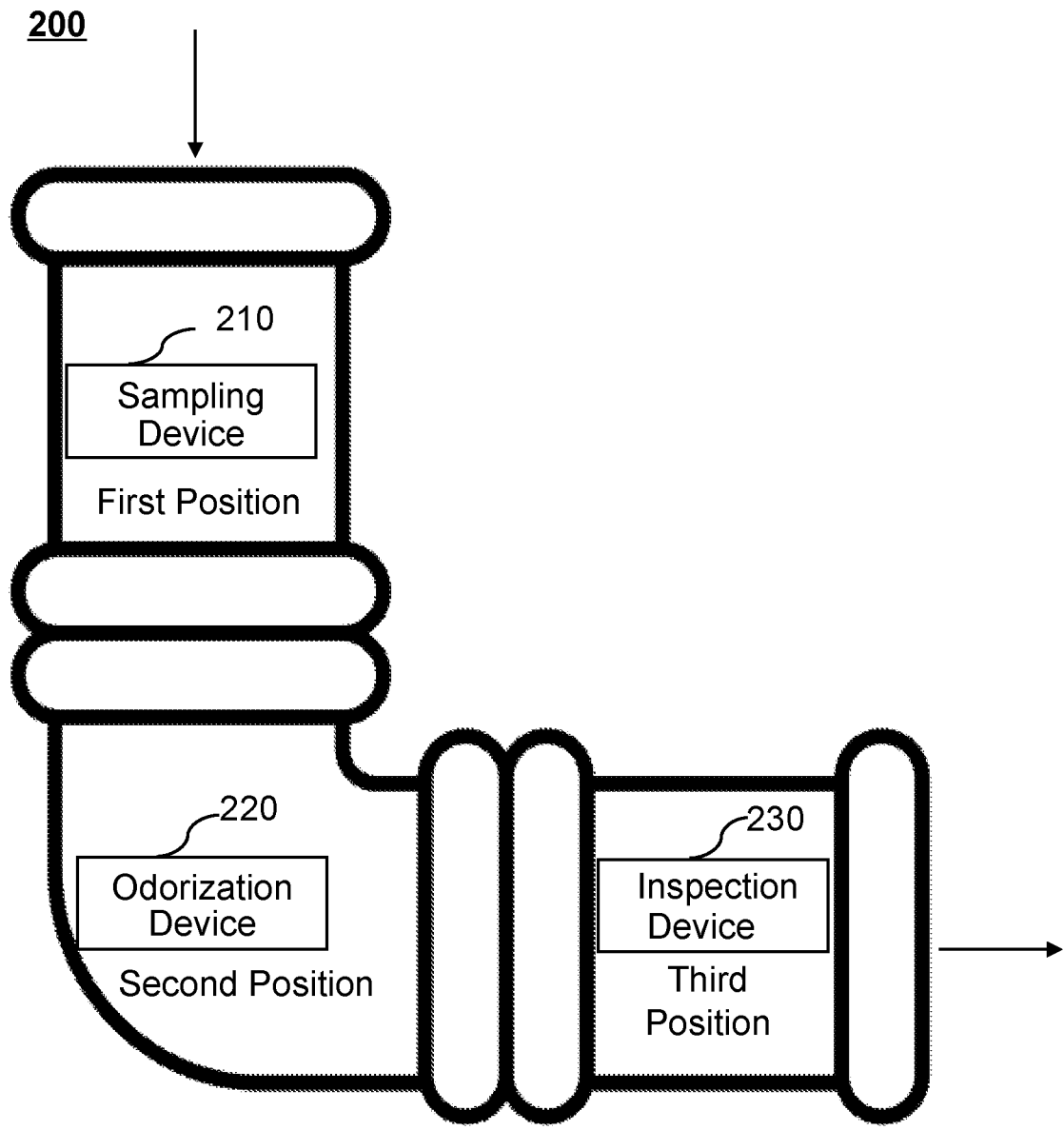
FIG. 2 is a schematic diagram illustrating an exemplary Internet of Things for controlling automatic odorization of smart gas device management according to some embodiments of the present disclosure.

The sampling device may be a device configured to obtain a gas sample and gas data thereof before odorization. In some embodiments, the sampling device may include a sensor for obtaining the gas data, such as a gas flow sensor for obtaining a gas flow, a temperature sensor for obtaining a gas temperature, etc. In some embodiments, an installation position of the sampling device may be set manually. As shown in FIG. 2, the sampling device 210 may be configured at a first position of the smart gas pipeline network.

The smart gas pipeline network may be a gas integrated management pipeline network constructed based on advanced technologies such as the Internet of Things, big data, cloud computing, and mobile Internet, which may realize the inspection and management of data such as gas pressure, flow, confined space, gas leakage, etc.

The first position may be a position where the sampling device takes a sample in the smart gas pipeline network. The first position may be set manually.

The first gas sample may be a gas sample taken by the sampling device from the first position. In some embodiments, the first gas sample may be a gas sample without odorization, which does not contain an odorant.

The gas data may be data that reflects relevant gas information in the first gas sample, for example, the gas data may include gas flow, gas flow rate, gas concentration, gas pressure, gas temperature, or the like, or any combination thereof. The gas data may be obtained based on a sensor configured within the sampling device, for example, the gas flow may be obtained based on a gas flow sensor.

In some embodiments, the gas data obtained by the sampling device may be transmitted to the smart gas data center through the smart gas sensor network platform.

In 320, odorizing at a second position of the smart gas pipeline network based on odorization parameters sent by the smart gas data center through an odorization device.

The odorization device may be a device configured to add an odorant to the gas in the smart gas pipeline network. For example, the odorization device may perform, based on odorization parameters (e.g., an odorization time, an odorization position, an odorization amount, etc.), odorization of a corresponding dose at a corresponding time. In some embodiments, an installation position of the odorization device may be set manually. As shown in FIG. 2, the odorization device 220 may be configured at a second position of the smart gas pipeline network.

The second position may be a position of the odorization device to odorize in the smart gas pipeline network. In some embodiments, the second position may be located after the first position. As shown in FIG. 2, the second position may be at a downstream node of the first position. The second position may be set manually.

The odorization parameters may be parameters corresponding to the odorization device for odorizing. For example, the odorization parameters may include a type of odorant, an odorization amount, an odorization frequency, an odorization time, or the like, or any combination thereof.

In some embodiments, the odorization parameters may be manually preset. For example, in a first odorization operation, the odorization amount may be manually preset to 1 L. The odorization time may be manually preset to 13:30, etc. In some embodiments, the odorization device may determine, based on an effect of a previous odorization, whether to update the odorization parameters and perform, based on the updated odorization parameters, subsequent odorization. For example, if the inspection data of the gas after the first odorization shows that the odorant concentration in the gas is too low compared with an odorization concentration standard value, the second odorization may be performed based on the updated odorization parameters. The odorization concentration standard value may be an odorant concentration that may be perceived by the human body when the gas leakage in the air reaches a prescribed percentage of a lower explosion limit (such as 20%, different types of gas may have different lower explosion limits). The odorization concentration standard value may be obtained in various ways such as querying a database or calculation based on information such as a type of odorant (e.g., tetrahydrothiophene, mercaptan, etc.), the type of gas (e.g., natural gas, liquefied petroleum gas, etc.), etc.

In 330, obtaining inspection data of a second gas sample at a third position of the smart gas pipeline network and transmitting the inspection data to the smart gas data center through the smart gas sensor network platform based on the inspection device, and the smart gas data center sending the inspection data to the smart gas pipeline network device parameter management sub-platform for analysis and processing.

The inspection device may be a device configured to obtain a gas sample after odorization and inspection data thereof. In some embodiments, the inspection device may include a sensor for obtaining the inspection data, such as an odorant concentration sensor for obtaining the odorant concentration in the gas, etc. In some embodiments, the installation position of the inspection device may be set manually. As shown in FIG. 2, an inspection device 230 may be configured at a third position of the smart gas pipeline network.

The third position may be a position where the inspection device takes and detects a sample in the smart gas pipeline network. In some embodiments, the third position may be located after the second position. As shown in FIG. 2, the third position may be at a downstream node of the second position. The third position may be set manually.

In some embodiments, a distance between the second position and the third position may be greater than a first threshold value. The first threshold value may be a system default value, an empirical value, a manually pre-set value, or the like, or any combination thereof, which may be set according to an actual need.

In some embodiments of the present disclosure, the distance between the second position and the third position may be greater than the first threshold, which may ensure that a spacing between the odorization device and the inspection device is sufficiently far apart to avoid a problem of uneven and insufficient mixing of odorant and gas in the detected second gas sample, thereby obtaining accurate inspection data.

The second gas sample may be a gas sample taken by the inspection device from the third position. In some embodiments, the second gas sample may be an odorized gas sample containing an odorant.

The inspection data may be data that reflect relevant gas information in the second gas sample. For example, the inspection data may include an odorant concentration in the gas, a gas flow rate, a gas concentration, a gas pressure, a gas temperature, any combination thereof. The inspection data may be obtained based on a sensor configured in the inspection device. For example, the odorant concentration in the gas may be obtained based on an odorant concentration sensor.

In 340, updating, based on the inspection data, the odorization parameters through the device parameter remote management module and sending updated odorization parameters to the smart gas data center, and the smart gas data center sending the updated odorization parameters to the smart gas object platform through the smart gas sensor network platform.

The device parameter remote management module may be a device configured to manage and control odorization operations. In some embodiments, the device parameter remote management module may update the odorization parameters based on the inspection data, transmit the updated odorization parameters to the smart gas data center, and then further send the updated odorization parameters to the odorization device, thereby realizing the control of the odorization process.

In some embodiments, the device parameter remote management module may update the odorization parameters based on the inspection data in various ways. For example, when the inspection data shows that the odorant concentration in the gas is lower than the odorization concentration standard value, the device parameter remote management module may increase the odorization amount in the odorization parameters appropriately.

In some embodiments, in order to update the odorization parameters based on the inspection data, the device parameter remote management module may be also configured to obtain a target odorization concentration; determine target odorization parameters based on the target odorization concentration and the inspection data; and update the odorization parameters based on the target odorization parameters.

The target odorization concentration may be an ideal value of odorant concentration after odorizing the gas. In the case of the target odorization concentration, if the gas leaks into the air, an odor of the odorant may make people aware of the danger in time before a danger occurs.

In some embodiments, the device parameter remote management module may determine the target odorization concentration based on the odorization concentration standard value. For example, the odorization concentration standard value may be used directly as the target odorization concentration, or a value of the odorization concentration standard value increased by a certain percentage (e.g., 1%) may be used as the target odorization concentration.

In some embodiments, the device parameter remote management module may obtain the odorization concentration standard value and the remaining concentration and determine the target odorization concentration based on the odorization concentration and the remaining concentration. More descriptions regarding the odorization concentration standard value may be found in the operation 330 and relevant descriptions thereof.

The remaining concentration may refer to a tolerated odorant concentration to ensure safety on the basis that the odorization concentration reaches the odorization concentration standard value. In an actual process of odorization, in order to ensure that gas leakage does not cause danger to personal and property safety, the odorant concentration may need to be increased based on the odorization concentration standard value. The increased concentration value may be the remaining concentration. For example, the odorization concentration standard value may be 20 mg/m$^3$. The remaining concentration may be 0.8 mg/m$^3$. More descriptions regarding the remaining concentration may be found in FIG. 5 and relevant descriptions thereof.

In some embodiments, the target odorization concentration may be determined based on the odorization concentration standard value and the remaining concentration. For example, the target odorization concentration may be obtained by adding the odorization concentration standard value to the remaining concentration.

In some embodiments, the device parameter remote management module may further determine the target odorization parameters by processing the target odorization concentration and the inspection data through a parameter determination model.

Figure 4:
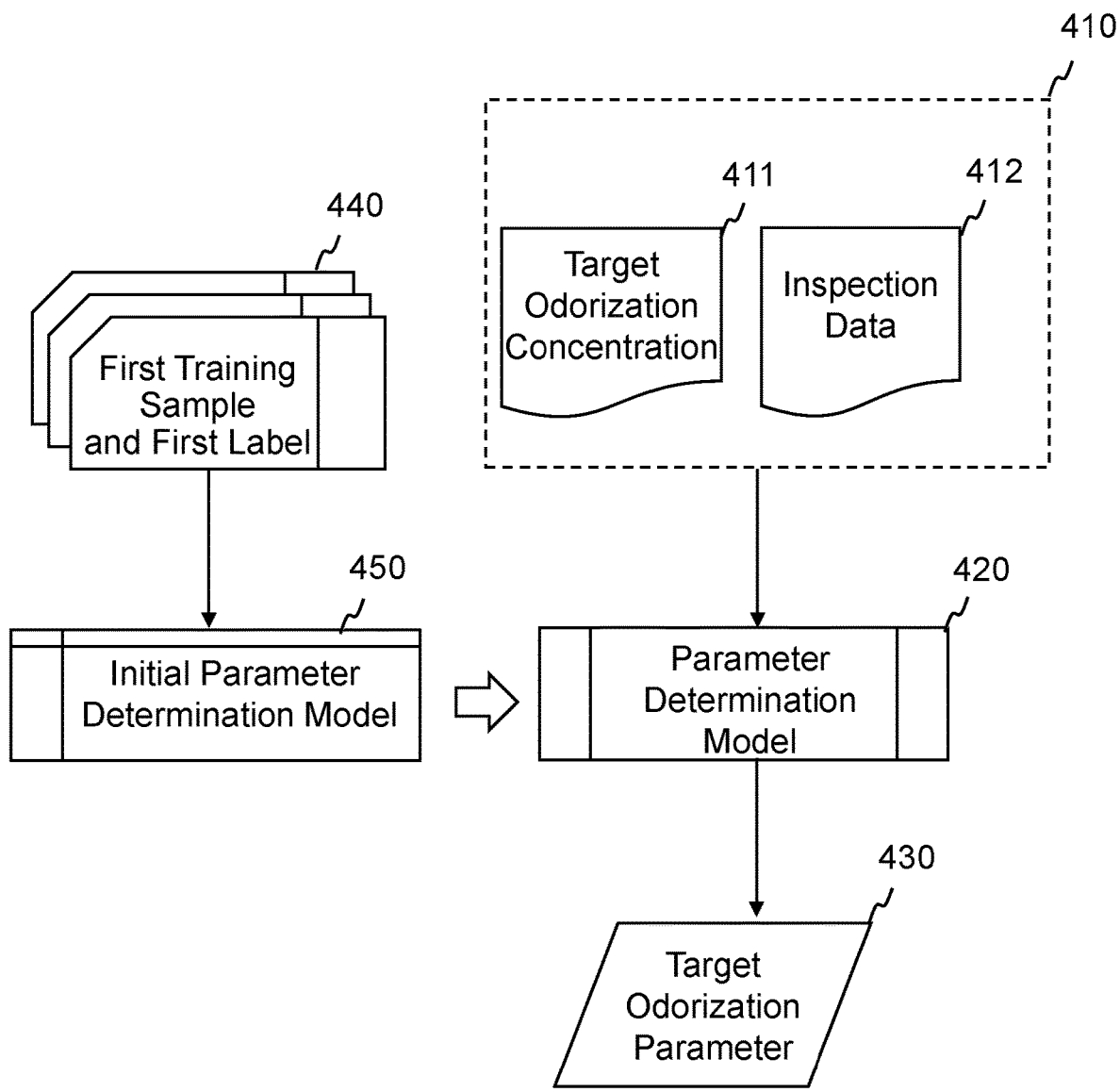
FIG. 4 is an exemplary schematic diagram illustrating determining target odorization parameters according to some embodiments of the present disclosure.

As shown in FIG. 4, an input 410 of a parameter determination model 420 may include a target odorization concentration 411 and inspection data 412. An output of the parameter determination model 420 may be a target odorization parameter 430.

In some embodiments, the parameter determination model may be a machine learning model. For example, the parameter determination model may be a deep neural networks (DNN) model, a recurrent neural networks (RNN) model, or the like, or any combination thereof.

In some embodiments, the parameter determination model may be obtained by reverse training. As shown in FIG. 4, a trained parameter determination model 420 may be obtained by training an initial parameter determination model 450 based on a first training sample and a first label 440.

In some embodiments, the first training sample may include historical odorization concentrations and historical inspection data corresponding to different odorization parameters in a historical odorization. The first label may include each of the odorization parameters. The first training sample and the first label may be determined by retrieving historical data.

In some embodiments of the present disclosure, determining the target odorization parameters through the parameter determination model may make the target odorization parameters more accurate and may effectively reduce a duration required to determine the target odorization parameters, thereby improving the operation efficiency of the Internet of Things system for controlling automatic odorization of smart gas device management.

In 350, odorizing, based on the updated odorization parameters, at the second position of the smart gas pipeline network through the odorization device.

In some embodiments, the odorization device may perform, based on the updated odorization parameters (e.g., an updated odorization time, an updated odorization amount, etc.) obtained from the smart gas data center, odorization of a corresponding dose at a corresponding time.

In some embodiments of the present disclosure, by updating the odorization parameters through the inspection data, the odorization parameters may be updated in real time based on the effect of historical odorization, thereby continuously adjusting the entire odorization process, so that the odorant concentration in the gas can reach a current national standard and waste of odorant can be reduced.

Figure 5:
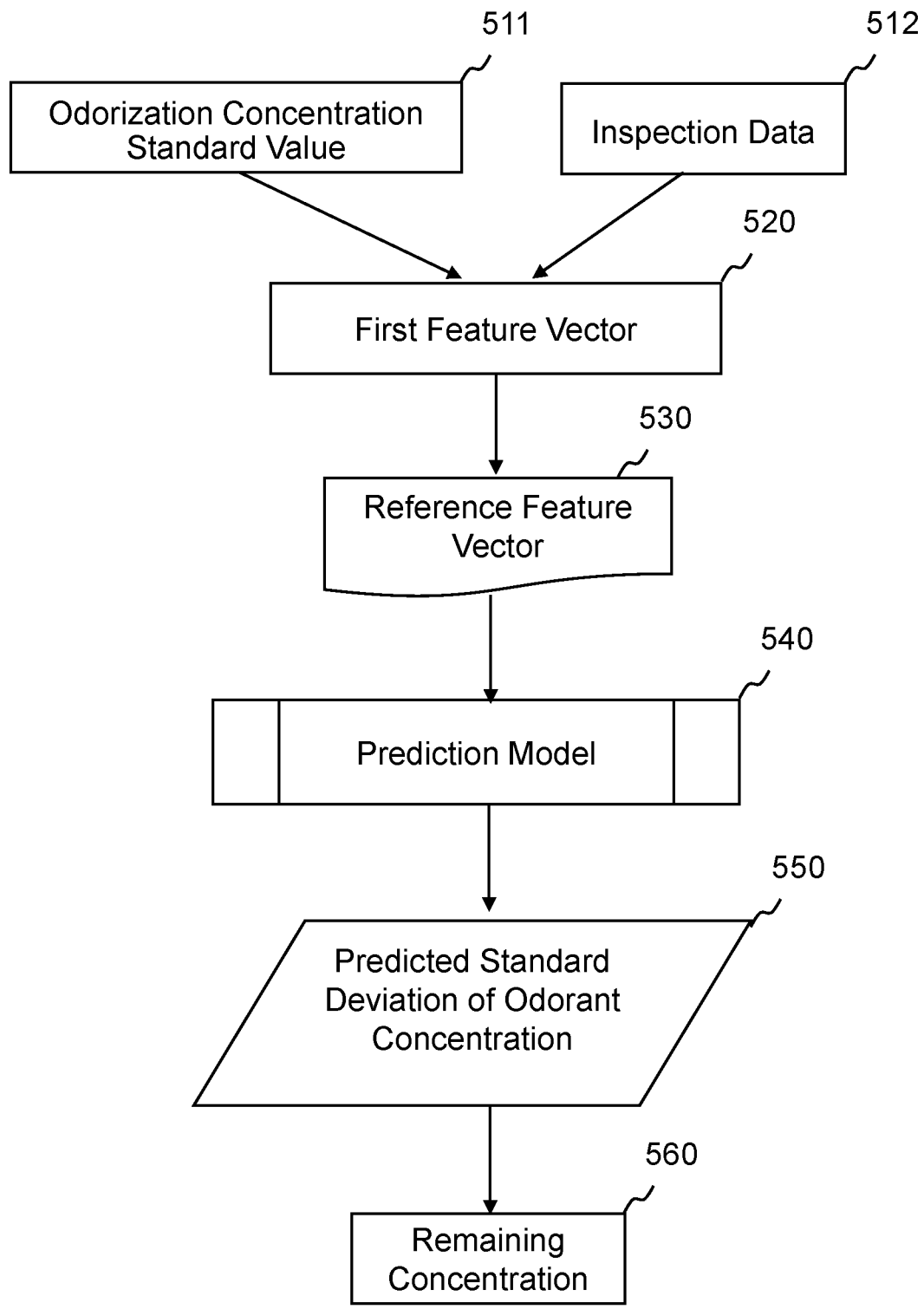
FIG. 5 is an exemplary schematic diagram illustrating obtaining a remaining concentration according to some embodiments of the present disclosure.

FIG. 5 is an exemplary schematic diagram illustrating obtaining a remaining concentration according to some embodiments of the present disclosure.

In some embodiments, the remaining concentration may be determined based on an odorization concentration standard value and inspection data.

As shown in FIG. 5, the device parameter remote management module may construct a first feature vector 520 based on the odorization concentration standard value 511 and the inspection data 512.

The first feature vector may be a vector that reflects a data feature of the odorization concentration standard value and the inspection data. The first feature vector may be determined based on the odorization concentration standard value and the inspection data in a previous odorization process, for example, the odorization concentration standard value and the inspection data may be used as each element value of the first feature vector, respectively. Exemplarily, in the previous odorization process, if the odorization concentration standard value is 20 mg/m$^3$, and the inspection data includes an odorant concentration of 18 mg/m$^3$, a gas flow rate of 2 L/s, a gas temperature of 29° C., . . . , then the first feature vector may be constructed as (20 mg/m$^3$, 18 mg/m$^3$, 2 L/s, 29° C., . . . ).

As shown in FIG. 5, the device parameter remote management module may determine a reference feature vector 530 based on the first feature vector 520.

In some embodiments, a way to determine the reference feature vector may include: forming a feature vector library by constructing a plurality of historical feature vectors with the same elements as the first feature vector based on the odorization concentration standard value during the historical odorization process and the corresponding historical inspection data, and determining, based on the first feature vector, the historical feature vector with a highest similarity from the feature vector library as the reference feature vector. Exemplarily, a way to calculate the similarity may include but is not limited to, a cosine similarity, a Euclidean distance, a Pearson correlation coefficient, etc.

As shown in FIG. 5, the device parameter remote management module may determine a predicted standard deviation 550 of the odorant concentration after odorization based on the odorization parameters by processing the reference feature vector 530 through a prediction model 540.

In some embodiments, there may be a difference between the odorant concentration in the gas and the target odorization concentration after odorization based on the odorization parameters. The predicted standard deviation of the odorant concentration may be a predicted value that reflects the difference between the odorant concentration in the gas and the target odorization concentration. The larger the predicted standard deviation of the odorant concentration is, the larger the difference between the odorant concentration and the target odorization concentration is.

The prediction model may be configured to determine the predicted standard deviation of the odorant concentration after odorization based on the odorization parameters. An input of the prediction model may be the reference feature vector and an output of the prediction model may be the predicted standard deviation of the odorant concentration after odorization based on the odorization parameters. In some embodiments, the prediction model may be a machine learning model, such as a neural network model, etc.

The prediction model may be obtained by training. More descriptions regarding the training process of the prediction model may be found in FIG. 7 and relevant descriptions thereof.

As shown in FIG. 5, the device parameter remote management module may determine a remaining concentration 560 based on the predicted standard deviation 550 of the odorant concentration.

In some embodiments, the device parameter remote management module may determine the remaining concentration based on the predicted standard deviation in a variety of ways. For example, the device parameter remote management module may determine the remaining concentration based on the predicted standard deviation by a conventional calculation manner, so that the target odorization concentration may be higher than the odorization concentration standard value in most cases (e.g., 99% of the cases).

In some embodiments of the present disclosure, based on the first feature vector, the feature vector with a smallest distance from the first feature vector may be determined from the feature vector library as the reference feature vector, and the reference feature vector may be used as the input of the prediction model, so that data most similar to a current situation in the historical odorization data may be used as the reference for the model prediction, thereby improving the accuracy of the prediction model and obtaining a more accurate predicted standard deviation of the odorant concentration, so as to further determine a more accurate remaining concentration.

Figure 6:
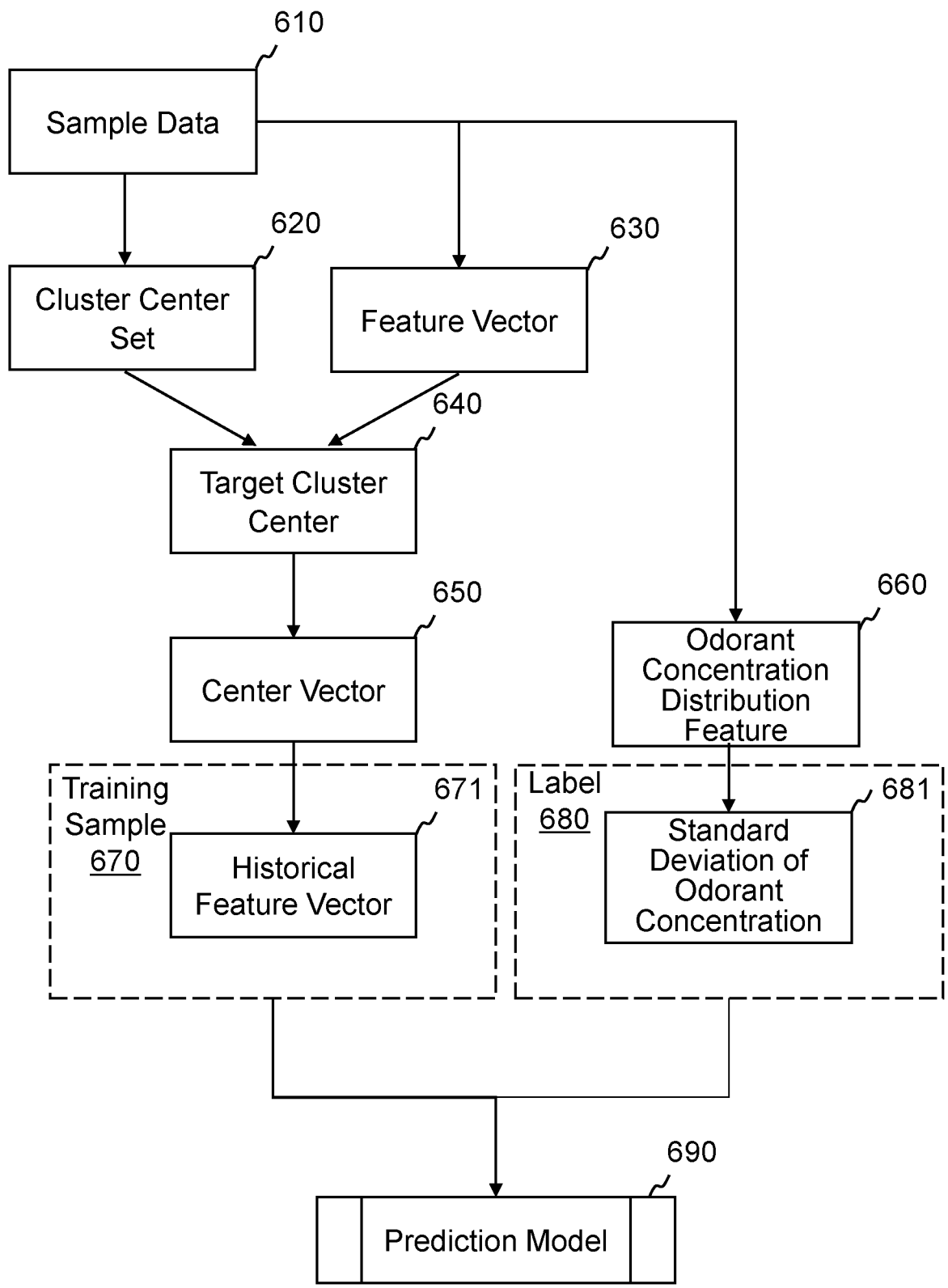
FIG. 6 is an exemplary schematic diagram illustrating training prediction model according to some embodiments of the present disclosure.

FIG. 6 is an exemplary schematic diagram illustrating training prediction model according to some embodiments of the present disclosure.

As shown in FIG. 6, a training process of the prediction model 690 may include the following operations.

A plurality of sample data 610 may be obtained. Each sample data 610 may be historical inspection data on which an odorization operation is performed.

A cluster center set 620 may be obtained by clustering the plurality of sample data 610.

For example, the plurality of sample data 610 may be clustered by a clustering algorithm to determine the cluster center set 620. The cluster center set may include one or more cluster centers. For example, features of a plurality of sample data may be extracted to determine feature vectors of the plurality of sample data, and the feature vectors of the sample data may be clustered by a clustering algorithm to obtain the cluster center set. The cluster center set may include cluster centers I and II. Exemplarily, a way to perform feature extraction may include but is not limited to, a multilayer perceptron, a convolutional neural network, a residual network, etc. The clustering algorithm may include but is not limited to, a k-means clustering algorithm, a density-based spatial clustering of applications with noise (DBSCAN) algorithm, etc.

For each of the plurality of sample data 610, the target cluster center 640 may be matched in the cluster center set 620 based on the feature vector 630 corresponding to each sample data 610, and a center vector 650 corresponding to the target cluster center 640 may be used as a historical feature vector 671. The target cluster center may be a cluster center closest to a feature vector corresponding to a certain sample data in the cluster center set. In some embodiments, for each cluster center, a mean value vector of the feature vectors of all the sample data in the cluster center may be determined as the center vector of the cluster center.

A standard deviation 681 of the odorant concentration may be determined based on an odorant concentration distribution feature 660 in the plurality of sample data 610.

The prediction model 690 may be trained by using the plurality of historical feature vectors 671 as training samples 670 and using the corresponding standard deviation 681 of the odorant concentration as a corresponding label 680.

For example, the training sample 670 and the label 680 may be input to an initial prediction model, a loss function may be established based on the label 680 and an output result of the initial prediction model, parameters of the initial prediction model may be updated, and training of the model may be completed to obtain a trained prediction model when the loss function satisfies a preset condition. The preset condition may be that the loss function converges, a count of iterations reaches a threshold value, etc.

In some embodiments of the present disclosure, in the training process of the prediction model, clustering may be performed on the sample data, the target cluster centers may be determined based on the clustering results, and then the training data and the label may be determined, and the historical feature vectors corresponding to the sample data of a same cluster may be used as input of the prediction model, thereby reducing the cost of obtaining the feature vectors and reducing the amount of data processing.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An Internet of Things system for determining odorization parameters of smart gas device management, comprising a smart gas user platform, a smart gas service platform, a smart gas device management platform, a smart gas sensor network platform, and a smart gas object platform, wherein the smart gas device management platform includes a smart gas data center and a smart gas pipeline network device parameter management sub-platform, the smart gas object platform is configured with a sampling device, an odorization device, and an inspection device, and the smart gas pipeline network device parameter management sub-platform is configured with a device parameter remote management module, wherein the sampling device is configured to obtain gas data of a first gas sample at a first position of a smart gas pipeline network and transmit the gas data to the smart gas data center through the smart gas sensor network platform, wherein the first position is a sampling position;

the odorization device is configured to odorize at a second position of the smart gas pipeline network based on the odorization parameters sent by the smart gas data center, wherein the second position is an odorization position;

the inspection device is configured to obtain inspection data of a second gas sample at a third position of the smart gas pipeline network and transmit the inspection data to the smart gas data center through the smart gas sensor network platform, and the smart gas data center sends the inspection data to the smart gas pipeline network device parameter management sub-platform for analysis and processing, wherein a distance between the second position and the third position is greater than a first threshold, wherein the third position is a detection position, and the first threshold is a system default value;

the device parameter remote management module is configured to:
obtain a target odorization concentration;
determine target odorization parameters by processing the target odorization concentration and the inspection data through a parameter determination model, wherein the parameter determination model is a machine learning model, wherein the parameter determination model is obtained by reverse training, and the reverse training includes:
obtaining historical odorization concentrations and historical inspection data corresponding to different odorization parameters in a historical odorization process as a first training sample, wherein the different odorization parameters are used as a first label of the first training sample; and
obtaining the parameter determination model by training based on the first training sample and the first label;
update the odorization parameters based on the target odorization parameters, and send updated odorization parameters to the smart gas data center, and the smart gas data center sends the updated odorization parameters to the smart gas object platform through the smart gas sensor network platform; and the odorization device is configured to odorize at the second position of the smart gas pipeline network based on the updated odorization parameters.

2. The Internet of Things system for determining odorization parameters of smart gas device management of claim 1, wherein to obtain the target odorization concentration, the device parameter remote management module is further configured to:
obtain an odorization concentration standard and a remaining concentration; and
determine the target odorization concentration based on the odorization concentration standard and the remaining concentration.

3. The Internet of Things system for determining odorization parameters of smart gas device management of claim 2, wherein to obtain the remaining concentration, the device parameter remote management module is further configured to:
construct a first feature vector based on the odorization concentration standard and the inspection data;
determine a reference feature vector based on the first feature vector;
determine a predicted standard deviation of an odorant concentration after odorization based on the odorization parameters by processing the reference feature vector through a prediction model, wherein the prediction model is a machine learning model; and
determine the remaining concentration based on the predicted standard deviation of the odorant concentration.

4. The Internet of Things system for determining odorization parameters of smart gas device management of claim 3, wherein the prediction model is obtained by a training process including:
obtaining a plurality of sample data, wherein each sample data is a historical inspection data on which an odorization operation is performed; and
obtaining a cluster center set by clustering the plurality of sample data;
for each of the plurality of sample data,
matching a target cluster center in the cluster center set based on a feature vector corresponding to each sample data and using a center vector corresponding to the target cluster center as a historical feature vector;
determining a standard deviation of the odorant concentration based on an odorant concentration distribution feature in the plurality of sample data; and
obtaining the prediction model by training using a plurality of historical feature vectors as a plurality of sets of training data and using the standard deviation of the odorant concentration as a training label.

5. The Internet of Things system for determining odorization parameters of smart gas device management of claim 1, wherein the gas data includes one or more of a gas flow, a gas flow rate, a gas concentration, a gas pressure, a gas temperature.

6. The Internet of Things system for determining odorization parameters of smart gas device management of claim 1, wherein the odorization parameters include one or more of a type of an odorant, an odorization amount, an odorization frequency, an odorization time.

7. The Internet of Things system for determining odorization parameters of smart gas device management of claim 1, wherein the inspection data includes one or more of the odorant concentration in gas, a gas flow rate, a gas concentration, a gas pressure, a gas temperature.

8. A method for determining odorization parameters of smart gas device management, implemented by an Internet of Things system for determining the odorization parameters of smart gas device management, wherein the Internet of Things system includes a smart gas user platform, a smart gas service platform, a smart gas device management platform, a smart gas sensor network platform, and a smart gas object platform, the smart gas device management platform includes a smart gas data center and a smart gas pipeline network device parameter management sub-platform, the smart gas object platform is configured with a sampling device, an odorization device, and an inspection device, the smart gas pipeline network device parameter management sub-platform is configured with a device parameter remote management module, and the method comprises:

obtaining gas data of a first gas sample at a first position of a smart gas pipeline network and transmitting the gas data to the smart gas data center through the smart gas sensor network platform based on the sampling device, wherein the first position is a sampling position;

odorizing at a second position of the smart gas pipeline network based on odorization parameters sent by the smart gas data center through the odorization device, wherein the second position is an odorization position;

obtaining inspection data of a second gas sample at a third position of the smart gas pipeline network and transmitting the inspection data to the smart gas data center through the smart gas sensor network platform based on the inspection device, and the smart gas data center sending the inspection data to the smart gas pipeline network device parameter management sub-platform for analysis and processing, wherein a distance between the second position and the third position is greater than a first threshold, wherein the third position is a detection position, and the first threshold is a system default value;

obtaining a target odorization concentration through the device parameter remote management module, and determining target odorization parameters by processing the target odorization concentration and the inspection data through a parameter determination model, wherein the parameter determination model is a machine learning model, wherein the parameter determination model is obtained by reverse training, and the reverse training includes:

obtaining historical odorization concentrations and historical inspection data corresponding to different odorization parameters in a historical odorization process as a first training sample, wherein the different odorization parameters are used as a first label of the first training sample; and obtaining the parameter determination model by training based on the first training sample and the first label;

updating the odorization parameters based on the target odorization parameters through the device parameter remote management module, and send updated odorization parameters to the smart gas data center, and the smart gas data center sends the updated odorization parameters to the smart gas object platform through the smart gas sensor network platform; and odorizing, based on the updated odorization parameters, at the second position of the smart gas pipeline network through the odorization device.

9. The method for determining odorization parameters of smart gas device management of claim 8, wherein the obtaining the target odorization concentration further includes:

obtaining an odorization concentration standard and a remaining concentration; and determining the target odorization concentration based on the odorization concentration standard and the remaining concentration.

10. The method for determining odorization parameters of smart gas device management of claim 9, wherein the obtaining the remaining concentration further includes:

constructing a first feature vector based on the odorization concentration standard and the inspection data;

determining a reference feature vector based on the first feature vector;

determining a predicted standard deviation of an odorant concentration after odorization based on the odorization parameters by processing the reference feature vector through a prediction model, wherein the prediction model is a machine learning model; and determining the remaining concentration based on the predicted standard deviation of the odorant concentration.

11. The method for determining odorization parameters of smart gas device management of claim 10, wherein the prediction model is obtained by a training process including:

obtaining a plurality of sample data, wherein each sample data is a historical inspection data on which an odorization operation is performed; and obtaining a cluster center set by clustering the plurality of sample data;

for each of the plurality of sample data,
matching a target cluster center in the cluster center set based on a feature vector corresponding to each sample data and using a center vector corresponding to the target cluster center as a historical feature vector;

determining a standard deviation of the odorant concentration based on an odorant concentration distribution feature in the plurality of sample data; and obtaining the prediction model by training using a plurality of historical feature vectors as a plurality of sets of training data and using the standard deviation of the odorant concentration as a training label.

12. The method for determining odorization parameters of smart gas device management of claim 8, wherein the gas data includes one or more of a gas flow, a gas flow rate, a gas concentration, a gas pressure, a gas temperature.

13. The method for determining odorization parameters of smart gas device management of claim 8, wherein the odorization parameters include one or more of a type of an odorant, an odorization amount, an odorization frequency, an odorization time.

14. The method for determining odorization parameters of smart gas device management of claim 8, wherein the inspection data includes one or more of the odorant concentration in gas, a gas flow rate, a gas concentration, a gas pressure, a gas temperature.

15. A non-transitory computer-readable storage medium storing computer instructions, wherein when reading the computer instructions in the storage medium, a computer implements the method for determining the odorization parameters of smart gas device management of claim 8.

* * * * *